United States Patent
Lisuk et al.

(10) Patent No.: US 10,503,574 B1
(45) Date of Patent: Dec. 10, 2019

(54) SYSTEMS AND METHODS FOR VALIDATING DATA

(71) Applicant: Palantir Technologies Inc., Palo Alto, CA (US)

(72) Inventors: David Lisuk, New York, NY (US); Guodong Xu, Shoreline, WA (US); Luis Voloch, Brooklyn, NY (US); Matthew Elkherj, Palo Alto, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 124 days.

(21) Appl. No.: 15/670,304

(22) Filed: Aug. 7, 2017

Related U.S. Application Data

(60) Provisional application No. 62/483,815, filed on Apr. 10, 2017.

(51) Int. Cl.
| | |
|---|---|
| *G06F 11/00* | (2006.01) |
| *G06F 11/07* | (2006.01) |
| *G06F 3/048* | (2013.01) |
| *G06Q 10/10* | (2012.01) |
| *G06F 17/18* | (2006.01) |

(Continued)

(52) U.S. Cl.
CPC .......... *G06F 11/0709* (2013.01); *G06F 3/048* (2013.01); *G06F 16/23* (2019.01); *G06F 16/43* (2019.01); *G06F 17/18* (2013.01); *G06Q 10/10* (2013.01)

(58) Field of Classification Search
CPC .................................................... G06F 11/0709
USPC ................. 714/48, 49, 50, 38.1, 57
See application file for complete search history.

(56) References Cited

U.S. PATENT DOCUMENTS

| | | |
|---|---|---|
| 6,057,757 A | 5/2000 | Arrowsmith et al. |
| 6,643,613 B2 | 11/2003 | McGee et al. |
| 7,028,223 B1 | 4/2006 | Kolawa et al. |

(Continued)

FOREIGN PATENT DOCUMENTS

| | | |
|---|---|---|
| AU | 2014203669 | 5/2016 |
| DE | 102014213036 | 1/2015 |

(Continued)

OTHER PUBLICATIONS

Geiger, Jonathan G., "Data Quality Management, The Most Critical Initiative You Can Implement", Data Warehousing, Management and Quality, Paper 098-29, Sugi 29, Intelligent Solutions, Inc., Bounder, CO, pp. 14, accessed Oct. 3, 2013.

(Continued)

*Primary Examiner* — Dieu Minh T Le

(74) *Attorney, Agent, or Firm* — Sheppard Mullin Richter & Hampton LLP

(57) ABSTRACT

Systems and methods are validating data in a data set. A data set including data to validate and a validator to use in validating the data is selected based on user input generated based on interactions of a user with a graphical user interface. The validator is applied to the data to determine whether one or more statistics generated through application of the validator to the data is valid or invalid based on a validation routine associated with the validator. A data quality report indicating whether the data set is valid or invalid, based on a determination of whether the one or more statistics is valid or invalid, is generated and selectively presented to the user through the graphical user interface.

18 Claims, 7 Drawing Sheets

(51) Int. Cl.
  *G06F 16/23* (2019.01)
  *G06F 16/43* (2019.01)

(56) References Cited

U.S. PATENT DOCUMENTS

| | | | |
|---|---|---|---|
| 7,117,430 | B2 | 10/2006 | Maguire et al. |
| 7,739,246 | B2 | 6/2010 | Mooney et al. |
| 7,877,421 | B2 | 1/2011 | Berger et al. |
| 8,601,326 | B1 | 12/2013 | Kirn |
| 8,799,867 | B1 | 8/2014 | Peri-Glass et al. |
| 8,924,389 | B2 | 12/2014 | Elliot et al. |
| 8,938,434 | B2 | 1/2015 | Jain et al. |
| 9,230,060 | B2 | 1/2016 | Friedlander et al. |
| 9,338,013 | B2 | 5/2016 | Castellucci et al. |
| 9,348,851 | B2 | 5/2016 | Kirn |
| 2002/0194058 | A1 | 12/2002 | Eldering |
| 2003/0040854 | A1* | 2/2003 | Rendahl ............ G01N 21/3504 701/31.4 |
| 2003/0088438 | A1 | 5/2003 | Maughan et al. |
| 2003/0171942 | A1 | 9/2003 | Gaito |
| 2004/0117387 | A1 | 6/2004 | Civetta et al. |
| 2004/0153837 | A1 | 8/2004 | Preston et al. |
| 2005/0060574 | A1* | 3/2005 | Klotz .................... H04L 41/22 726/4 |
| 2005/0102328 | A1 | 5/2005 | Ring et al. |
| 2006/0129992 | A1 | 6/2006 | Oberholtzer et al. |
| 2006/0161558 | A1 | 7/2006 | Tamma et al. |
| 2006/0209085 | A1 | 9/2006 | Wong et al. |
| 2008/0104407 | A1 | 5/2008 | Horne et al. |
| 2009/0199047 | A1 | 8/2009 | Vaitheeswaran et al. |
| 2009/0282097 | A1 | 11/2009 | Alberti et al. |
| 2010/0125470 | A1 | 5/2010 | Chisholm |
| 2010/0211550 | A1 | 8/2010 | Daniello et al. |
| 2010/0228786 | A1 | 9/2010 | Torok |
| 2011/0131547 | A1 | 6/2011 | Elaasar |
| 2012/0290879 | A1 | 11/2012 | Shibuya et al. |
| 2013/0006947 | A1 | 1/2013 | Akinyemi et al. |
| 2013/0024731 | A1 | 1/2013 | Shochat et al. |
| 2013/0091084 | A1 | 4/2013 | Lee |
| 2013/0097130 | A1 | 4/2013 | Bingol et al. |
| 2013/0198565 | A1 | 8/2013 | Mancoridis et al. |
| 2013/0226879 | A1 | 8/2013 | Talukder et al. |
| 2013/0246316 | A1 | 9/2013 | Zhao et al. |
| 2014/0146650 | A1* | 5/2014 | Alber .................. G11B 27/002 369/53.41 |
| 2014/0156617 | A1 | 6/2014 | Tomkins |
| 2015/0012509 | A1 | 1/2015 | Kirn |
| 2015/0112641 | A1 | 4/2015 | Faraj |
| 2015/0188715 | A1 | 7/2015 | Castelluci et al. |

FOREIGN PATENT DOCUMENTS

| | | |
|---|---|---|
| EP | 1566758 | 8/2005 |
| EP | 1962222 | 8/2008 |
| EP | 2551799 | 1/2013 |
| EP | 2897051 | 7/2015 |
| GB | 2517582 | 2/2015 |
| NL | 2013134 | 1/2015 |
| WO | WO 2005/010685 | 2/2005 |
| WO | WO 2011/017289 | 2/2011 |
| WO | WO 2011/071833 | 6/2011 |
| WO | WO 2012/079836 | 6/2012 |
| WO | WO 2013/067077 | 5/2013 |

OTHER PUBLICATIONS

Johnson, Steve, "Access 2013 on demand," Access 2013 on Demand, May 9, 2013, Que Publishing.

Pythagoras Communications Ltd., "Microsoft CRM Duplicate Detection," Sep. 13, 2011, https://www.youtube.com/watch?v=j-7Qis0D0Kc.

* cited by examiner

SYSTEMS AND METHODS FOR VALIDATING DATA

CROSS REFERENCE TO RELATED APPLICATIONS

This application claims the benefit under 35 U.S.C. § 119(e) of the U.S. Provisional Application Ser. No. 62/483,815, filed Apr. 10, 2017, the content of which is hereby incorporated by reference in its entirety.

FIELD OF THE INVENTION

This disclosure relates to approaches for validating data.

BACKGROUND

Under conventional approaches, a platform for validating data is provided. Through platforms provided under conventional approaches a user has to manually input parameters and routines to manually create validators for use in validating data. Specifically, under conventional approaches, a user has to manually input parameters and routines in a specific computer or logical language to create validators and control validation of data using validators. In particular, users may lack the technical knowledge to provide necessary input in a computer or logical language to properly extract desired statistics from data and subsequently validate the statistics using a validator.

SUMMARY

Various embodiments of the present disclosure can include systems, methods, and non-transitory computer readable media configured to obtain one or more source code files that correspond to a software program. At least one data set can be selected to validate based on user input received from a user interacting with a graphical user interface. A validator including at least one validation parameters can be selected based on the user input. The validator can be applied to the data in the data set to determine whether one or more statistics generated through application of the validator to the data in the data set using the at least one validation parameter is valid according to at least one validator routine associated with the validator. The data set can be flagged as invalid if at least one of the one or more statistics generated through application of the validator are determined to be invalid according to the at least one validation routine. A data quality report can be generated for the data set indicating whether the data set is valid or invalid based on a determination of whether the one or more statistics are valid according to the at least one validation routine. The data quality report can be selected presented to a user through a graphical user interface.

In some embodiments, the systems, methods, and non-transitory computer readable media can be configured to select at least one validation parameter of a selected validator based on user input.

In some embodiments, the systems, methods, and non-transitory computer readable media can be configured to select at least one validation routine based on user input and create a customized validator by associating a validator with the at least one validation routine.

In some embodiments, the systems, methods, and non-transitory computer readable media can be configured to select at least one validation parameter based on user input and create a customized validator by associating the at least one validation parameter with the validator.

In some embodiments, the systems, methods, and non-transitory computer readable media can be configured to receive additional user input from a user. The additional user input can be used to modify an already used validator to create a modified validator by modifying at least one validation parameter of the validator. The modified validator can be applied to data in a data set to generate an additional one or more statistics which are determined to be valid or invalid based on a validation routine associated with the validator. Another data quality report can be generated for the data set based on application of the modified validator to the data set. Another data quality report can be selectively presented to the user through the graphical user interface.

In some embodiments, the systems, methods, and non-transitory computer readable media can be configured to receive additional user input from a user. The additional user input can be used to modify an already used validator to create a modified validator by modifying at least one validation routine of the validator. The modified validator can be applied to data in a data set to generate an additional one or more statistics which are determined to be valid or invalid based on the modified validation routine associated with the validator. Another data quality report can be generated for the data set based on application of the modified validator to the data set. Another data quality report can be selectively presented to the user through the graphical user interface.

In some embodiments, the systems, methods, and non-transitory computer readable media can be configured to re-apply a validator to data in a data set to determine whether one or more statistics generated through re-application of the validator to the data in the data set are valid according to at least one validation routine associated with the validator. Another data quality report can be generated based on a determination of whether the one or more statistics generated through re-application of the validator to the data in the data set are valid according to the at least one validation routine associated with the validator. Another data quality report can be selectively presented to the user through the graphical user interface.

In some embodiments, the systems, methods, and non-transitory computer readable media can be configured to re-apply a validator to data in a data set based on one or a combination of re-application instructions received from a user, a passage of a specific amount of time, and a change made to the data in the data set.

In some embodiments, the systems, methods, and non-transitory computer readable media can be configured to select a plurality of data sets including data to validate using a validator. The validator can be concurrently applied to the data in the plurality of data sets to determine whether one or more statistics generated through application of the validator to the data in the plurality of data sets using at least one validation parameter are valid according to at least one validation routine associated with the validator. A data quality report can be generated for the plurality of data sets indicating whether the plurality of data sets is valid or invalid based on a determination of whether the one or more statistics is valid according to the at least one validation routine. The data quality report can be selected presented to a user through a graphical user interface.

In some embodiments, the systems, methods, and non-transitory computer readable media can be configured to select a plurality of validators to apply to data in a data set. The plurality of validators can be concurrently applied to the data in the data set to determine whether one or more statistics generated through application of the validators to the data in the data set using at least one validation parameter are valid according to at least one validation routine associated with the validator. A data quality report can be generated for the data set indicating whether the data set is valid or invalid based on a determination of whether the one or more statistics are valid according to the at least one validation routine associated with the plurality of validators. The data quality report can be selected presented to a user through a graphical user interface.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Under conventional approaches, a platform for validating data is provided. Through platforms provided under conventional approaches a user has to manually input parameters and routines to manually create validators for use in validating data. Specifically, under conventional approaches a user has to manually input parameters and routines in a specific computer or logical language to create validators and control validation of data using validators. In particular, users may lack the technical knowledge to provide necessary input in a computer or logical language to properly extract desired statistics from data and subsequently validate the statistics using a validator.

A claimed solution rooted in computer technology overcomes problems specifically arising in the realm of computer technology. In various embodiments, a user can select a specific data set to validate, and select a specific validator to utilize in validating data in the data set. A specific validator selected by a user can include at least one validation routine associated with the validator for use in validating statistics generated through application of the validator to the data in the data set. In certain embodiments, a user can provide input to modify the at least one validation routine associated with the validator to create a customized validator. Additionally, in various embodiments, a user can provide input to associate or disassociate validation routines with the validator to create a customized validator. A user can provide at least one validation parameters to associate with the validator for use in generating at least one statistic to be validated from the data in the data set when the validator is applied to the data in the data set. The data in the data set can be flagged as invalid if it is determined the at least one statistic generated through application of the validator to the data in the data set using the at least one validation parameter is determined to be invalid according to the at least one validation routine associated with the validator. A data quality report can be generated for the data set indicating whether the data set is invalid or invalid based on a determination of whether the at least one statistics generated through application of the validator to the data in the data set is determined to be valid or invalid according to the at least one validation routine associated with the validator. The data quality report can be selectively presented to the user through a graphical user interface for purposes of informing the user whether the data in the data set is valid according to application of the validator to the data in the data set.

Figure 1:
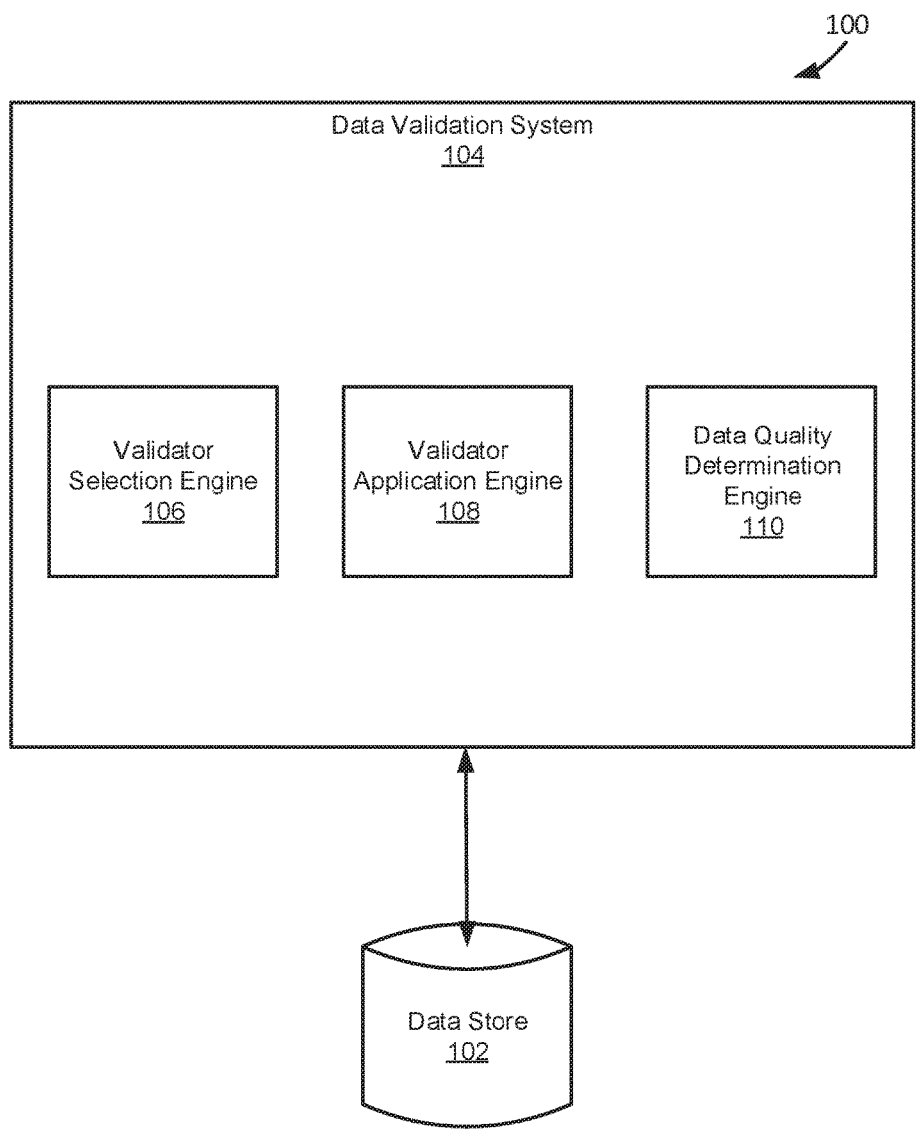
FIG. 1 illustrates an example environment for validating data in a data set using a validator, in accordance with various embodiments.

FIG. 1 illustrates an example environment 100 for validating data in a data set using a validator. The example environment 100 includes a data store 102. The data store 102 functions to store data to be validated. For example, the data store 102 can store a data set including data to be validated through application of a validator to the data set. The data store 102 can store multiple data sets including data to be validated. For example, the data store 102 can store two different data sets containing different data to be validated concurrently using the same validator.

As shown in FIG. 1, the example environment 100 also includes a data validation system 104. The example environment 100 can include one or more processors and memory. The one or more processors and memory of the example environment 100 can be included as part of the data validation system 104. The processors can be configured to perform various operations of the data validation system 104 by interpreting machine-readable instructions. The data validation system 104 can be implemented through, at least in part, or otherwise accessed through a graphical user interface presented to a user. In various embodiments, the data validation system 104 can be implemented through, at least in part, a graphical user interface presented to the user through natural language of a user. In being implemented, at least in part, through a graphical user interface presented in a natural language of a user, a user can control or otherwise access the data validation system 104 without prior knowledge of functions or computer language used to control validation of data.

In various embodiments, the data validation system 104 is configured to access data stored in the data store 102 for purposes of validating data stored in the data store 102 using a validator. The data validation system 104 can access data stored in the data store 102 through one or an applicable combination of a local area network, a wide area network, an enterprise network, and a local device. In accessing data stored in the data store 102, the data validation system 104 can select one or a plurality of data sets stored in the data store 102 to apply one or a plurality of validators to for purposes of validating data contained in the one or a plurality of data sets. For example, the data validation system 104 can select two tables stored in the data store 102 to apply a join statistics validator to for purposes of determining how many rows are joined and fail to join between the two tables. In some embodiments, the data validation system 104 can select one or a plurality of validators to apply to data sets stored in the data store 102. For example, based on user input, the data validation system 104 can select a table equality validator to apply to two tables stored in the data store 102 for purposes of determining if the two tables have one or a combination of the same schema, row count, and exact equality between each other, as part of validating the two tables. In various embodiments, the data validation system 104 can apply one or a plurality of validators to data for purposes of validating the data. For example, the data validation system 104 can apply a column histogram validator to a table to determine the occurrence rate of elements in a table above a threshold amount.

In various embodiments, user input received by data validation system 104 and used to control validation of data can be generated based on user interaction with a graphical user interface presented to a user for purposes of controlling validation of data. For example, through a graphical user interface a selection of different validators capable of being used in validating data can be presented to the user. Further in the example, through the graphical user interface, a user can select one or a plurality of the validators presented to the user for purposes of validating the data. Additionally, in the example, user input for controlling validation of data can be generated based on the one or a plurality of the validators selected by the user in interacting with the graphical user interface.

As shown in FIG. 1, in some embodiments, the data validation system 104 can include a validator selection engine 106, a validator application engine 108, and a data quality determination engine 110. The validator selection engine 106, the validator application engine 108, and the data quality determination engine 110 can be executed by the processor(s) of the data validation system 104 to perform various operations including those described in reference to the validator selection engine 106, the validator application engine 108, and the data quality determination engine 110.

In various embodiments, the validator selection engine 106 can be configured to select a validator to apply to at least one data set for use in validating data in the data set. A validator can include at least one validation parameter and a validation routine for use in validating data. A validation parameter, included as part of a validator, can be used to select statistics to extract from data in a data set for purposes of validating the data. For example, a validation parameter can indicate a specific column in a table to extract statistics from for purposes of validating the data. In another example, a validation parameter can identify specific columns that include unique identifiers of rows in a table. A validation parameter, included as part of a validator, can be pre-defined or set by a user. For example, a user can indicate through user input specific columns to generate statistics from for purposes of determining if the data is valid. A validation routine, included as part of a validator, can include rules or functions performed on statistics extracted from data to determine if the data is valid. For example, a validation routine can specify determining a maximum value, a mean value, and a minimum value for all values in a column in a table, and compare the values to threshold values.

In various embodiments, the validator selection engine 106 can be configured to present a plurality of pre-defined validators to a user. A user can select one or a plurality of pre-defined validators presented to them for purposes of applying the validators to a data set to validate data in the data set. Examples of pre-defined validators include but are not limited to: a numeric summary validator which can include a validation parameter of an identification of a specific numeric type column in a table and a validation routine of determining one or a combination of a mean value, a maximum value, and a minimum value for values in the column; a key statistics validator which can include validation parameters of an identification of one or a plurality of specific columns in a table and one or a combination of validation routines of calculating row counts for the columns, counts of distinct values in the columns, whether the one or a plurality of specific columns can act as a primary key, and determine a text match regular expression pattern; a null percentage validator which can include a validation parameter of an identification of a specific column in a table and one or a combination of validation routines of determining how many rows have null values in the column and a percent of rows in the column having null values; a column relation validator which can include validation parameters of an identification of one or a plurality of specific columns in a table and one or a combination of validation routines of determining the relation between values in the columns, e.g. one-to-one, one-to-many, many-to-one, and many-to-many; a join statistics validator which can include one or a plurality of validation parameters of join keys between tables and one or a combination of validation routines of determining how many rows join between the tables and how many rows fail to join between the tables; a column histogram validator which can include validation parameters of an identification of a column, a histogram, and how many elements in the column to keep and a validation routine of determining an occurrence rate of a elements above, at, or below a threshold frequency occurrence rate; and a table equality validator which can include validation parameters of an identification of two specific tables and one or a combination of validation routines of determining if the two tables have the same schema, if the two tables have the same row count, and the exact equality between the two tables.

In various embodiments, the validator selection engine 106 can be configured to generate a customized validator for a user based on user input. The validator selection engine 106 can generate a customized validator by creating a validator with either or both customized validation routines and validation parameters. For example, if a user wants to compute specific statistics for purposes of validating data, then the validator selection engine 106 can generate a custom validator with validation parameters for use in generating the specific statistics when the custom validator is applied to a data set. In another example, if a user wants to make sure specific statistics meet specific criteria in validating data of a data set, then the validator section engine 106 can generate one or a combination of validation routines to test whether the specific statistics meet the specific criteria as part of validating the data of the data set. The validator selection engine 106 can generate a customized validator by modifying either or both validation parameters and validation routines of a pre-defined validator. For example, the validator selection engine 106 can modify a numeric summary validator to create a customized validator by modifying a validation routine of the numeric summary validator to include summing the maximum and minimum values in a column.

In various embodiments, the validator application engine 108 can be configured to apply one or a plurality of validators to one or a plurality of data sets for purposes of validating data in the one or plurality of data sets. In applying a validator to a data set, the validator application engine 108 can generate statistics from data in the data set using validation parameters included as part of the validator. For example, the validator application engine 108 can extract values of a specific column in a table based on an identification of the specific column as a validation parameter. Additionally, in applying a validator to a data set, the validator application engine 108 can determine if generated statistics through application of the validator are valid based on one or a plurality of validation routines included as part of the validator. For example, if a number of null values in a column of a table of a data set fails to reach a threshold null value amount, then the validator application engine can determine data of the data set is invalid.

In various embodiments, the validator application engine 108 can be configured to apply a validator to data in a data set based on one or a combination of receipt of instructions from a user, a passage of a specific amount of time, and an occurrence of a change to data in a data set. For example, the validator application engine 108 can apply a validator to data in a data bet upon receipt of re-application instructions from a user. In another example, the validator application engine 108 can apply a validator to data in a data set after twenty-four hours have passed since a validator was last applied to the data for purposes of validating the data. In yet another example, the validator application engine 108 can apply a validator to data in a data set after values have been added to a column of a table of the data set. In various embodiments, the validator application engine 108 can apply or re-apply a validator to data in a data after a specific amount of time set by a user. For example, a user can specify applying a validator to data in a data set every twelve hours.

In various embodiments, the data quality determination engine 110 can be configured to generate a data quality report for purposes of reporting validity of data determined through application of a validator to a data set. A data quality report generated by the data quality determination engine 110 can include applicable data related to reporting of validity of data. For example, a data quality report generated by the data quality determination engine 110 can indicate one or combination of an identification of specific data that was tested for purposes of validity, whether or not data is found to be valid, an identification of a specific validator applied to data to determine if the data is valid, validation parameters of a validator applied to data to determine if the data is valid, statistics generated based on validation parameters and generated through application of a validator, validation routines of the validator used to determine if data is valid, times at which a validator was applied to data to determine validity, and triggers for applying a data validator to data to determine if the data is valid. Further a data quality report generated by the data quality determination engine 110 can include applicable data related to reporting of validity of data as it evolves over time, e.g. according to multiple instances of application of validators to validate data. For example, a data quality report generated by the data quality determination engine 110 can include prior values of statistics as part of validated data as it changes over time.

In various embodiments, the data quality determination engine 110 can be configured to generate a data quality report based on a determination of whether data in a data set is determined to be valid or invalid. The data quality determination engine 110 can generate a data quality report based on a determination of whether one or more statistics generated through application of a validator to a data set are determined to be invalid based on at least one validation routine associated with the validator. For example, the data quality determination engine 110 can generate a data quality report indicating specific statistics generated through application of a validator were found to be invalid based on a validation routine associated with the validator.

In various embodiments, the data quality determination engine 110 can flag a data set as invalid or valid. The data quality determination engine 110 can flag a data set as invalid or valid based on whether statistics generated through application of a validator to data of the data set are found invalid or valid according to at least one validation routine of the validator. For example, the data quality determination engine 110 can flag a data set as invalid if a number of statistics greater than a threshold number of statistics are found to be invalid according to a validation routine of a validator applied to data of the data set. The data quality determination engine 110 can use whether a data set is flagged as invalid or valid to generate a data quality report. For example, if a data set is flagged as invalid, then the data quality determination engine 110 can generate a data quality report to indicate the data set is invalid and the reasons the data set was found invalid, e.g. an identification of which specific statistics were found invalid.

In various embodiments, the data quality determination engine 110 can generate a new data quality report or update a data quality report after each instance of application of a validator to a data set. For example, each time a validator is applied to a data set to validate data in the data set, the data quality determination engine 110 can generate a new data quality report to reflect results of application of the validator to the data set in each instance of application of the validator. In another example, each time a validator is applied to a data set to validate data in the data set, the data quality determination engine 110 can update an already existing data quality report to include the results of application of the validator to the data set in each instance of application of the validator.

In various embodiments, the data quality determination engine 110 can provide a data quality report to a user through an applicable mechanism. Specifically, the data quality determination engine 110 can email a data quality report to a user, upload a data quality report for access by a user through a graphical user interface, such as the graphical user interfaces described herein, or provide a notification to a user that a data quality report is available for their viewing. For example, the data quality determination engine 110 can email a user a notification that a new or updated data quality report is available for their viewing through an applicable graphical user interface, such as the graphical user interfaces described herein. The data quality determination engine 110 can provide a data quality report to a user according to user preferences. For example, if user preferences of a user specify notifying the user by through email when a data quality report is available for review, then the data quality determination engine 110 can email a notification to the user when a new data quality report is generated for review by the user.

Figure 2:
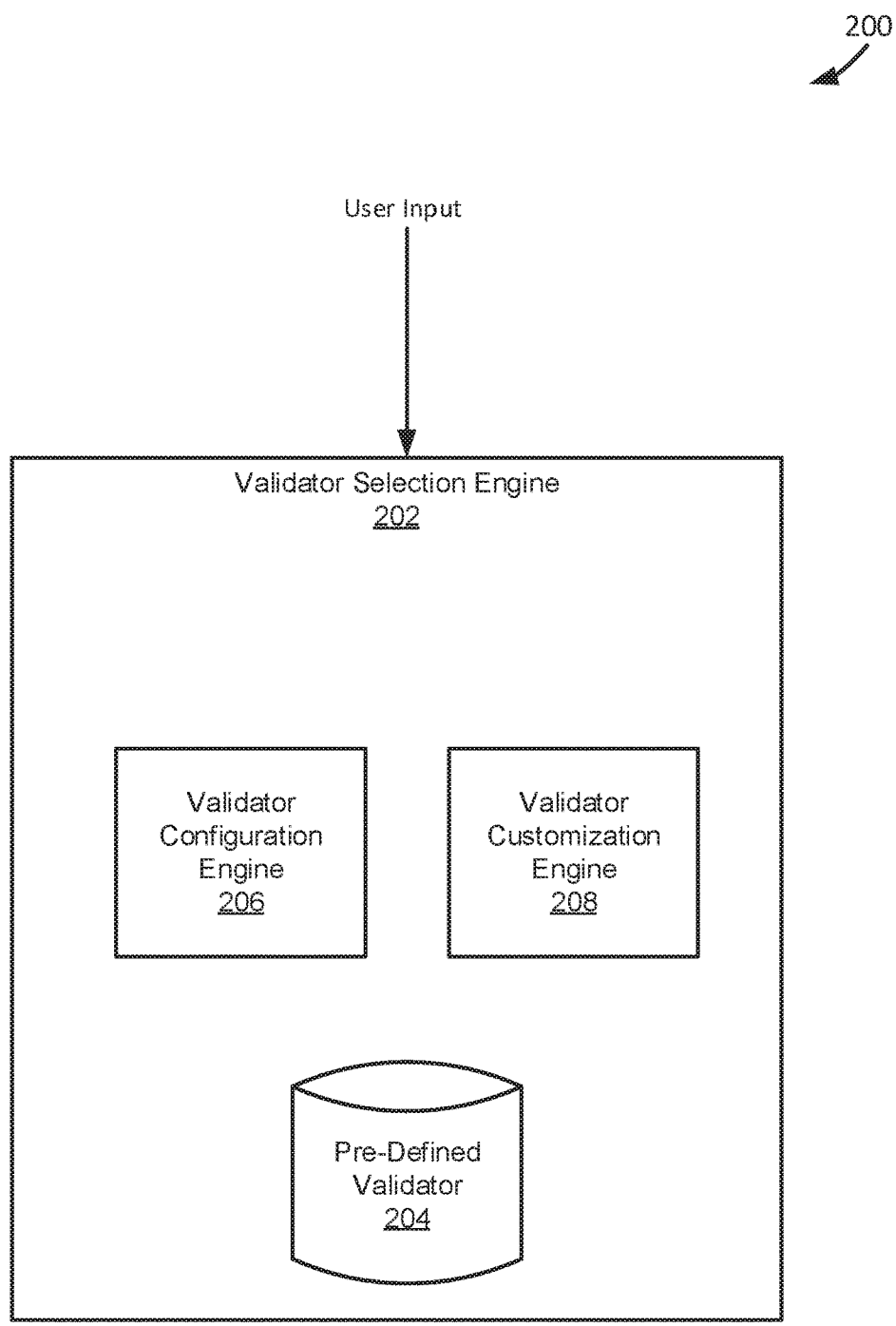
FIG. 2 illustrates an example environment for selecting and configuring a validator used in validating data, in accordance with various embodiments.

FIG. 2 illustrates an example environment 200 for selecting and configuring a validator used in validating data. As shown in FIG. 2, the example environment 200 includes a validator selection engine 202. The example environment 200 can include one or more processors and memory. The one or more processors and memory of the example environment 200 can be included as part of the validation selection engine 202. The processors can be configured to perform various operations of the validator selection engine 202 by interpreting machine-readable instructions. The validator selection engine 202 can be implemented through, at least in part, or otherwise accessed through a graphical user interface presented to a user. In various embodiments, the validator selection engine 202 can be implemented through, at least in part, a graphical user interface presented to the user through natural language of a user.

In various embodiments, the validator selection engine 202 is configured to communicate with a user for purposes of selecting and configuring a validator for use in validating data. The validator selection engine 202 can present pre-defined validators to a user, from which a user can select one or a plurality of pre-defined validators to apply in validating data. For example, the validator selection engine 202 can present a list of pre-defined validators including a table equality validator and a join statistics validator to a user. The validator selection engine 202 can receive user input indicating a selection of one or a combination of selected pre-defined validators to apply in validating data. Additionally, the validator selection engine 202 can receive user input indicating validation parameters to associate with one or more selected pre-defined validators. The validator selection engine 202 can use validation parameters indicated by user input to configure one or more selected pre-defined validators for use in generating statistics from data using the validation parameters through application of the validators.

In various embodiments, the validator selection engine 202 is configured to create a customized validator. The validator selection engine can create a customized validator from user input indicating either or both validation parameters and validation routines to include in the validator for use in validating data. In certain embodiments, the validator selection engine 202 can create a customized validator by modifying a pre-defined validator. For example, the validator selection engine 202 can modify a validation routine associated with a pre-defined validator to create a customized validator. Further, in certain embodiments, the validator selection engine 202 can create a customized validator that is a new validator from either or both unique validation parameters and validation routines. For example, the validation selection engine 202 can create a customized validator with unique validation parameters and validation routines different from parameters routines of pre-defined validators.

As shown in FIG. 2, in some embodiments, the validator selection engine 202 can include a pre-defined validator data store 204, a validator configuration engine 206, and a validator customization engine 208. The validator configuration engine 206 and the validator customization engine 208 can be executed by the processor(s) of the validator selection engine 202 to perform various operations including those described in reference to the validator configuration engine 206 and the validator customization engine 208.

In various embodiments, the pre-defined validator data store 204 stores pre-defined validator data indicating pre-defined validators. Pre-defined validator data stored in the pre-defined validator data store 204 can indicate a name of a pre-defined validator, a description of functions of a pre-defined validator, one or more validation parameters to define or already defined for a pre-defined validator, and one or more validation routines of a pre-defined validator. For example, pre-defined validator data stored in the pre-defined validator data store 204 can indicate validation parameters to defined or already defined and validation routines of a numeric summary validator, a key statistics validator, a null percentage validator, a column relation validator, a join statistics validator, a column histogram validator, and a table equality validator.

In various embodiments, the validator configuration engine 206 is configured to select and configure one or more pre-defined validators for use in validating data. The validator configuration engine 206 can present one or more available pre-defined validators to a user for use by the user in selecting one or more pre-defined validator to use in validating data. For example, the validator configuration engine 206 can present the names of validators and functions of the validators to a user. The validator configuration engine 206 can present pre-defined validators to a user with pre-defined validator data stored in the pre-defined validator data store 204. For example, the validator configuration engine 206 can use pre-defined validator data stored in the pre-defined validator data store to present the names of different validators to a user. In certain embodiments, the validator configuration engine 206 can select specific pre-defined validators to present to a user. For example, the validator configuration engine 206 can select specific pre-defined validators to present to a user based on a type of data to validate, e.g. as selected by the user.

In various embodiments, the validator configuration engine 206 is organized to configure a selected validator with validation parameters. The validator configuration engine 206 can configure a selected validator with validation parameters indicated by user input received from a user. For example, if user input indicates a specific column including row unique identifiers, then the validator configuration engine 206 can configure a validator with a validation parameter including the specific column, for use in applying the validator to validate data. In certain embodiments, the validator configuration engine 206 can query a user for input regarding specific validation parameters for configuring a validator. For example, the validator configuration engine 206 can query a user for specific validation parameters needed to configure a specific pre-defined validator. The validator configuration engine 206 can query a user for validation parameters based on pre-defined validation data stored in the pre-defined validator data store 204. For example, if pre-defined validator data stored in the pre-defined validator data store 204 indicates a specific parameter is needed to configure a pre-defined validator, then the validator configuration engine 206 can query a user for the specific parameter.

In various embodiments, the validator customization engine 208 is configured to create a customized validator for use in validating data in a data set. For example, the validator customization engine 208 can create a customized validator with either or both at least one validation parameter and at least one validation routine different from parameters and routines of pre-defined validators. In creating a customized validator, the validator customization engine 208 can create a customized validator based on received user input. For example, the validator customization engine 208 can create a customized validator based on at least one validation routine provide as part of a user input to the validator customization engine 208. The validator customization engine 208 can create a customized validator using a pre-defined validator. For example, the validator customization engine 208 can create a customized validator by modifying a validation routine of a pre-defined validator. Additionally, the validator customization engine 208 can create a customized validation by generating a new validator including new validation parameters and validation routines different from parameters and routines associated with a pre-defined validator.

Figure 3:
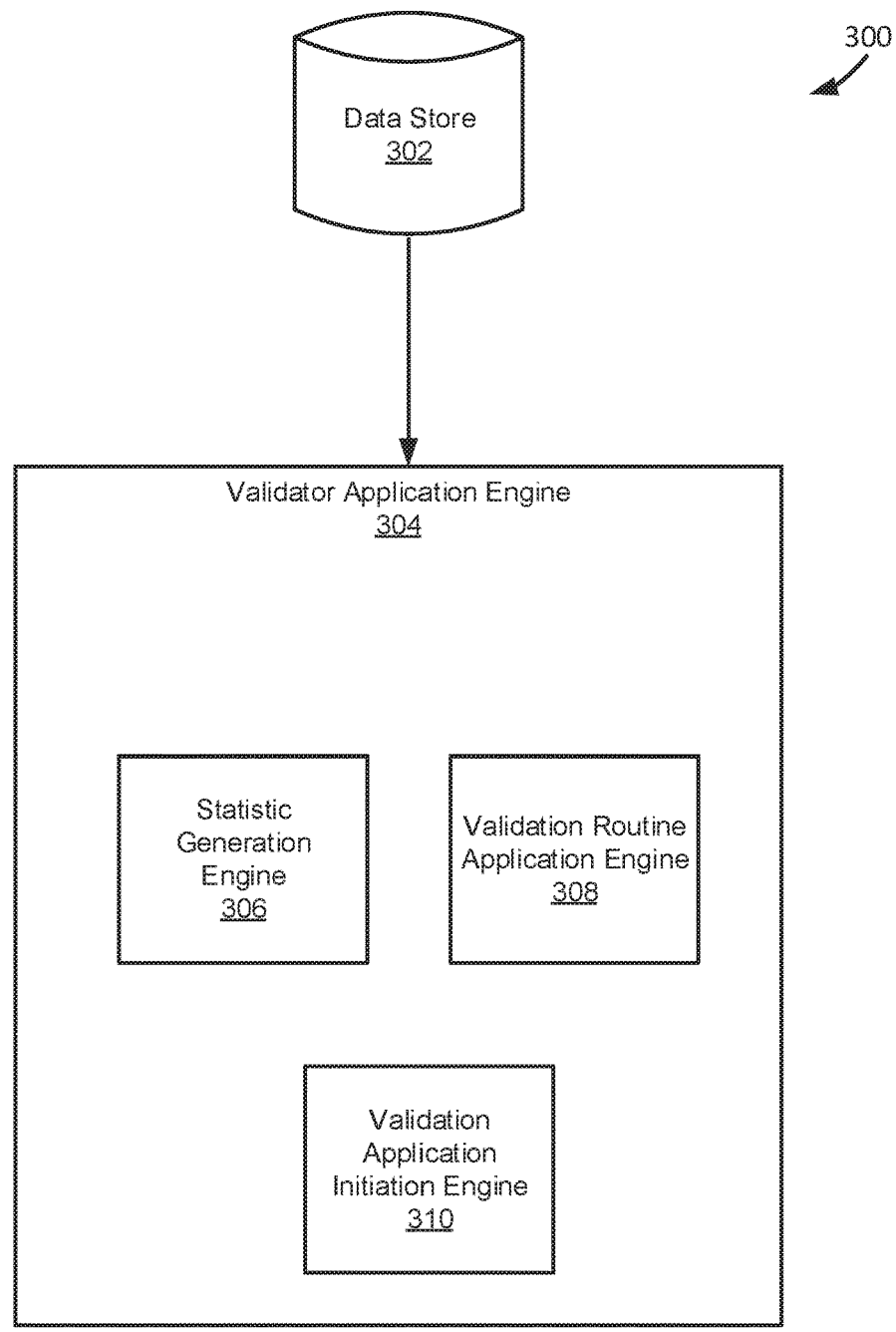
FIG. 3 illustrates an example environment for applying a validator to determine if data is valid, in accordance with various embodiments.

FIG. 3 illustrates an example environment 300 for applying a validator to determine if data is valid. As shown in FIG. 3, the example environment 300 includes a data store 302. The data store 302 can be configured to store data as part of data sets to be validated through application of a validator to the data sets.

As shown in FIG. 3, the example environment 300 includes a validator application engine 304. The example environment 300 can include one or more processors and memory. The one or more processors and memory of the example environment 300 can be included as part of the validator application engine 304. The processors can be configured to perform various operations of the validator application engine 304 by interpreting machine-readable instructions. The validator application engine 302 can be implemented through, at least in part, or otherwise accessed through a graphical user interface presented to a user. In various embodiments, the validator application engine 304 can be implemented through, at least in part, a graphical user interface presented to the user through natural language of a user.

In various embodiments, the validator application engine 304 is configured to apply a validator to data for use in validating the data. In various embodiments, the validator application engine 304 is configured to apply a validator to generate statistics. For example, the validator application engine 304 can be configured to apply a validator to data to generate statistics from the data according to validation parameters. In various embodiments, the validator application engine can be configured to apply a validator to generated statistics to determine if the statistics are valid according to at least one validation routine associated with the validator. For example, the validator application engine 304 can be applied to generated statistics to determine if a number of null values in common exceeds a threshold null value for purposes of determining if the statistics are valid.

As shown in FIG. 3, in some embodiments, the validator application engine 304 can include a statistics generation engine 306, a validation routine application engine 308, and a validator application initiation engine 310. The statistics generation engine 306, the validation routine application engine 308, and the validation application initiation engine 310 can be executed by the processor(s) of the validator application engine 304 to perform various operations including those described in reference to the statistics generation engine 306, validation routine application engine 308, and the validation application initiation engine 310.

In various embodiments, the statistic generation engine 306 can function to generate statistics through application of a validator to data in a data set to determine if the data is valid. The statistic generation engine 306 can apply a validator selected and configured according to user input to generate statistics for purposes of determining whether data is valid. For example, the statistic generation engine 306 can apply validation parameters of a specific validator selected and configured according to user input to generate the statistics according to the validation parameters.

In various embodiments, the validation routine application engine 308 can function to determine if generated statistics are valid according to application of a validator to data in a data set. The validation routine application engine 308 can determine if statistics are valid according to a validation routine included as part of a validator applied to data. For example, the validation routine application engine 308 can determine if statistics generated through application of a validator to data are valid based on whether they meet conditions included as part of a validation routine of the validator.

In various embodiments, the validation application initiation engine 310 can function to control application of a validator to data for purposes of determining the validity of the data. In controlling application of a validator to data, the validation application initiation engine 310 can cause application a validator to data in order to generate statistics. For example, the validation application initiation engine 310 can instruct the statistics generation engine 306 to generate statistics through application of a validator to data. Additionally, in controlling application of a validator to data, the validation application initiation engine 310 can cause application of a validation routine to statistics for purposes of determining whether the statistics are valid. For, example, the validation application initiation engine 310 can instruct the validation routine application engine 308 to determine if statistics are valid based on application of a validation routine to the statistics. In certain embodiments, the validation application initiation engine 310 can control application of a validator to data based on one or a combination of receipt of instructions from a user, a passage of a specific amount of time, and an occurrence of a change to data in a data set. For example, the validation application initiation engine 310 can determine to apply a validator to data if the data is changed.

Figure 4:
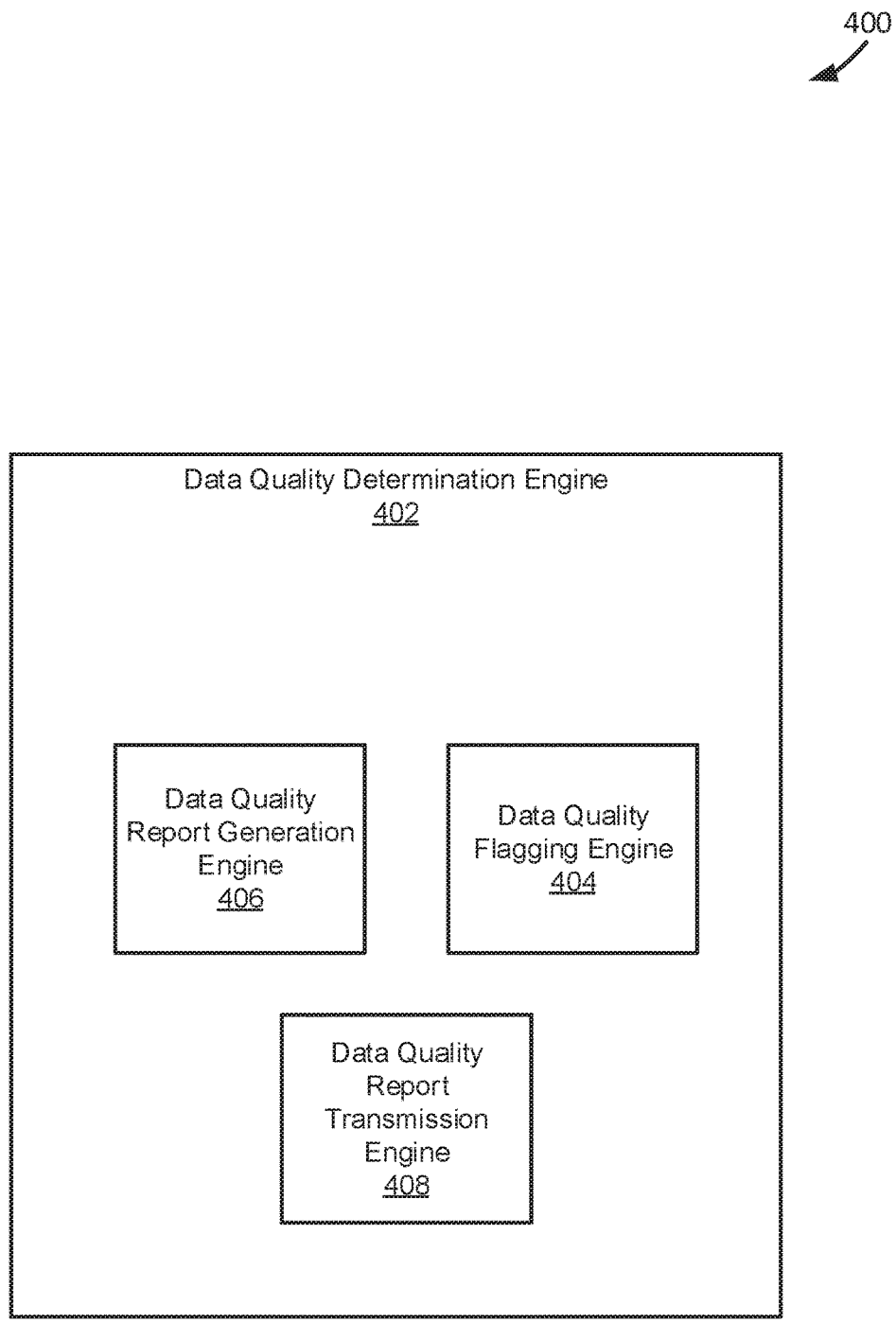
FIG. 4 illustrates an example environment for generating a data quality report based on application of one or more validators to data, in accordance with various embodiments.

FIG. 4 illustrates an example environment 400 for generating a data quality report based on application of one or more validators to data. As shown in FIG. 4, the example environment 400 includes a data quality determination engine 402. The example environment 400 can include one or more processors and memory. The one or more processors and memory of the example environment 400 can be included as part of the data quality determination engine 402. The processors can be configured to perform various operations of the data quality determination engine 402 by interpreting machine-readable instructions. The data quality determination engine 402 can be implemented through, at least in part, or otherwise accessed through a graphical user interface presented to a user. In various embodiments, the data quality determination engine 402 can be implemented through, at least in part, a graphical user interface presented to the user through natural language of a user.

In various embodiments, the data quality determination engine 402 can be configured to generate a data quality report based on application of one or more validators to data in one or more data sets. The data quality determination engine 402 can generate a data quality report to indicate one or a combination of an identification of specific data that was tested for purposes of validity, whether or not data is found to be valid, an identification of a specific validator applied to data to determine if the data is valid, validation parameters of a validator applied to data to determine if the data is valid, statistics generated based on validation parameters and generated through application of a validator, validation routines of the validator used to determine if data is valid, times at which a validator was applied to data to determine validity, and triggers for applying a data validator to data to determine if the data is valid. In generating a data quality report, the data quality determination engine 402 can generate a new data quality report for each instance a validator is applied to data to determine validity or update an already existing data quality report each time a validator is applied to the data. For example, the data quality determination engine 402 can generate update a data quality report to show statistics generated through application of a validator to data as they evolve over time in response to the data changing.

As shown in FIG. 4, in some embodiments, the data quality determination engine 402 can include a data quality flagging engine 404, a data quality report generation engine 406, and a data quality report transmission engine 408. The data quality flagging engine 404, the data quality report generation engine 406, and the data quality report transmission engine 408 can be executed by the processor(s) of the data quality determination engine 402 to perform various operations including those described in reference to the data quality flagging engine 404, the data quality report generation engine 406, and the data quality report transmission engine 408.

In various embodiments, the data quality flagging engine 404 can function to flag data as valid or invalid based on application of a validator to the data. Specifically, the data quality flagging engine 404 can flag data as valid or invalid if statistics generated according to validation parameters of a validator applied to data are determined to be invalid according to a validation routine of the validator. For example, if a mean of values in a row of a table included as part of data, as determined through application of a validator to the data, is less than a threshold mean value, as indicated by a validation routine of the validator, then the data quality flagging engine 404 can flag the data as invalid. In certain embodiments, the data quality flagging engine 404 can flag data as invalid if a specific amount of statistics generated through application of a validator the data are found to be invalid. For example, if 50% of statistics generated through application of a validator to data are found to be invalid according to a validation routine of the validator, then the data quality flagging engine 404 can flag the data as invalid.

In various embodiments, the data quality report generation engine 406 can function to generate a data quality report based on application of one or more validators to data for purposes of validating the data. The data quality report generation engine 406 can generate a data quality report to include one or a combination of an identification of specific data that was tested for purposes of validity, whether or not data is found to be valid, an identification of a specific validator applied to data to determine if the data is valid, validation parameters of a validator applied to data to determine if the data is valid, statistics generated based on validation parameters and generated through application of a validator, validation routines of the validator used to determine if data is valid, times at which a validator was applied to data to determine validity, and triggers for applying a data validator to data to determine if the data is valid. Additionally, the data quality report generation engine 406 can generate a data quality report based on whether data in a data set is flagged as valid or invalid through application of a validator to the data. For example, if data in a data set is flagged as invalid, then the data quality report generation engine 406 can generate a data quality report indicating the data is flagged as invalid.

In various embodiments, the data quality report generation engine 406 can generate a new data quality report or update an already existing data quality report. For example, the data quality report generation engine 406 can generate a new data quality report each instance a validator is applied to data for purposes of validating the data. In another example, the data quality report generation engine 406 can update an already existing data quality report for each instance a validator is applied to data for purposes of validating the data.

In various embodiments, the data quality reporting generation engine 406 can generate and modify a data quality report based on user input. For example, if user input indicates specific statistics the user wants to view in data quality reports, then the data quality report generation engine 406 can generate a data quality report to include the specific statistics based on the user input. In another example, if user input indicates a user no longer wants to view specific statistics in a data quality report, then the data quality report generation engine 406 can modify the data quality report to exclude the specific statistics.

In various embodiments, the data quality report transmission engine 408 can be configured to transmit a data quality report to a user through an applicable mechanism. For example, the data quality report transmission engine 408 can either or both upload a data quality report for access through a graphical user interface, such as the graphical user interfaces described herein, and email a data quality report to a user. In another example, the data quality report transmission engine 408 can provide a notification to a user indicating a new or updated data quality report is available to the user. In certain embodiments, the data quality report transmission engine 408 can transmit a data quality report to a user according to user preferences. For example, if user preferences indicate a user wants to view a data quality report after is uploaded through a graphical user interface and have a notification sent informing them that the data quality report is available, then the data quality report transmission engine 408 can upload the data quality report and send a notification to the user informing them that the data quality report is available for review.

Figure 5:
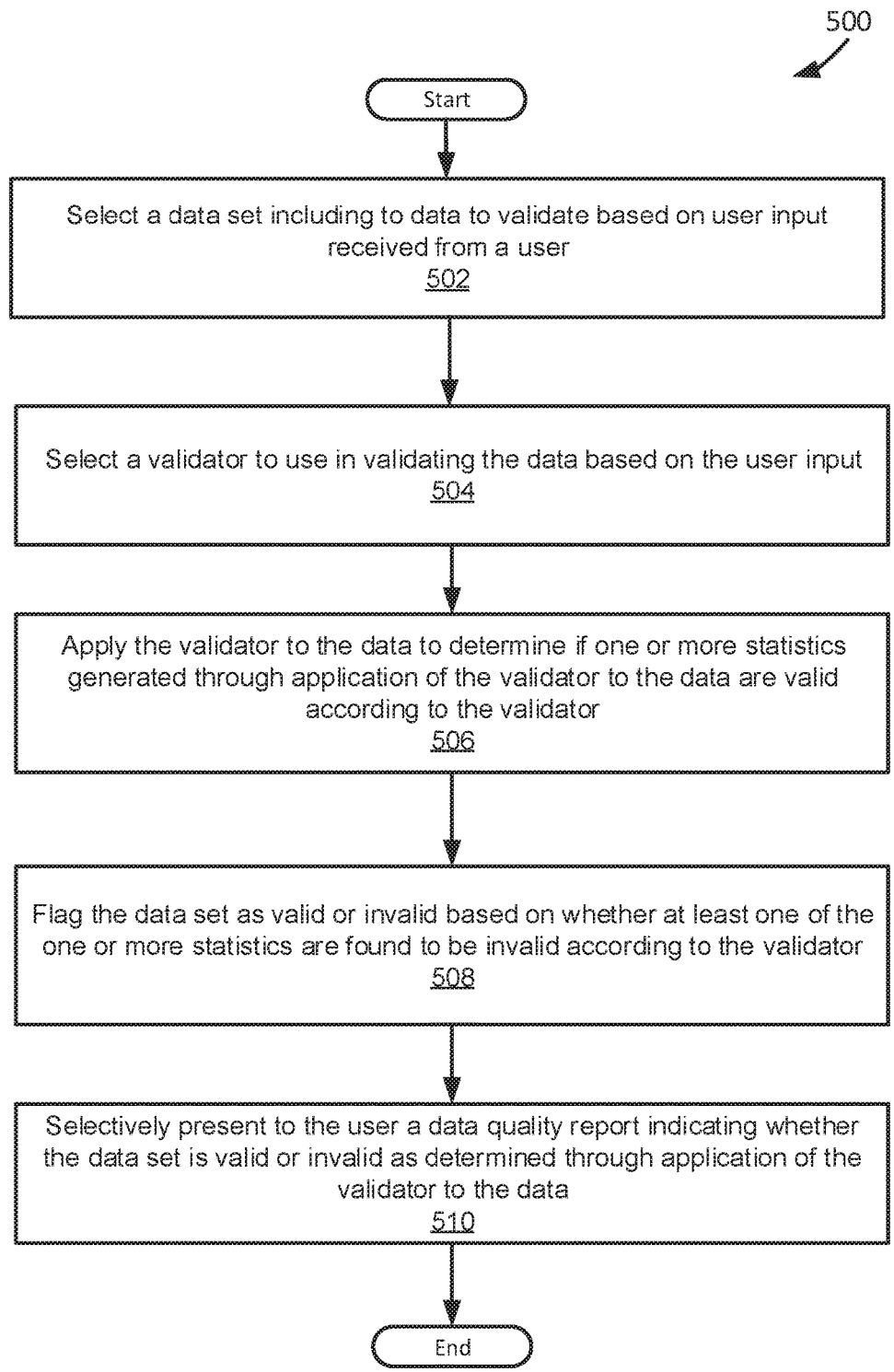
FIG. 5 illustrates a flowchart of an example method, in accordance with various embodiments.

FIG. 5 illustrates a flowchart of an example method 500, according to various embodiments of the present disclosure. The method 500 may be implemented in various environments including, for example, the environment 100 of FIG. 1. The operations of method 500 presented below are intended to be illustrative. Depending on the implementation, the example method 500 may include additional, fewer, or alternative steps performed in various orders or in parallel. The example method 500 may be implemented in various computing systems or devices including one or more processors.

At block 502, a data set including data to validate is selected based on user input received from a user. For example, user input can indicate a table with data to validate. In certain embodiments, a user a plurality of data sets to validate can be selected based on user input received from a user. User input indicating a data set including data to validate can be generated and received based on user interactions with a graphical user interface, such as the graphical user interfaces described herein. An applicable system for controlling validation of data using a validator, such as the data validation systems described herein, can select a data set including data to validate based on user input received from a user.

At block 504, a validator to user in validating the data is selected based on user input. In selecting a validator to user, a list of pre-defined validators can be presented to the user, and the user can select a validator from the list of pre-defined validators, as indicated by the user input. Additionally, in selecting a validator, the validator can be configured with validation parameters provided by the user and indicated by the user input. In certain embodiments, a customized validator can be selected and configured with either or both one or more custom validation parameters and one or more custom validation routines. An applicable engine for selecting a validator, such as the validator selection engines described herein, can select a validator to use in validating the data based on the user input.

At block 506, the validator is applied to the data to determine if one or more statistics generated through application of the validator to the data are valid according to the validator. For example, one or more statistics can be extracted from the data based on one or more validation parameters of the validator. Further in the example, the one or more statistics can be determined to be valid or invalid based on one or more validation routines associated with the validator. An applicable engine for applying a validator to data, such as the validator application engines described herein, can apply the validator to the data to determine if one or more statistics generated through application of the validator to the data are valid according to the validator.

At block 508, the data set is flagged as valid or invalid based on whether at least one of the one or more statistics are found to be invalid according to the validator. For example, if a number of the one or more statistics greater than a threshold amount are found to be invalid, then the data set can be flagged as invalid. An applicable engine for flagging a data set as valid or invalid, such as the data quality flagging engines described herein, can flag the data set as valid or invalid based on whether at least one of the one or more statistics are found to be invalid according to the validator.

At block 510, a data quality report indicating whether the data set is valid or invalid as determined through application of the validator to the data is selectively presented to the user. A data quality report can be presented to the user through an applicable graphical user interface, such as the graphical user interfaces described herein. An applicable engine for generating a data quality report, such as the data quality report generation engines described herein, can selectively present to the user a data quality report indicating whether the data set is valid or invalid as determined through application of the validator to the data.

Figure 6:
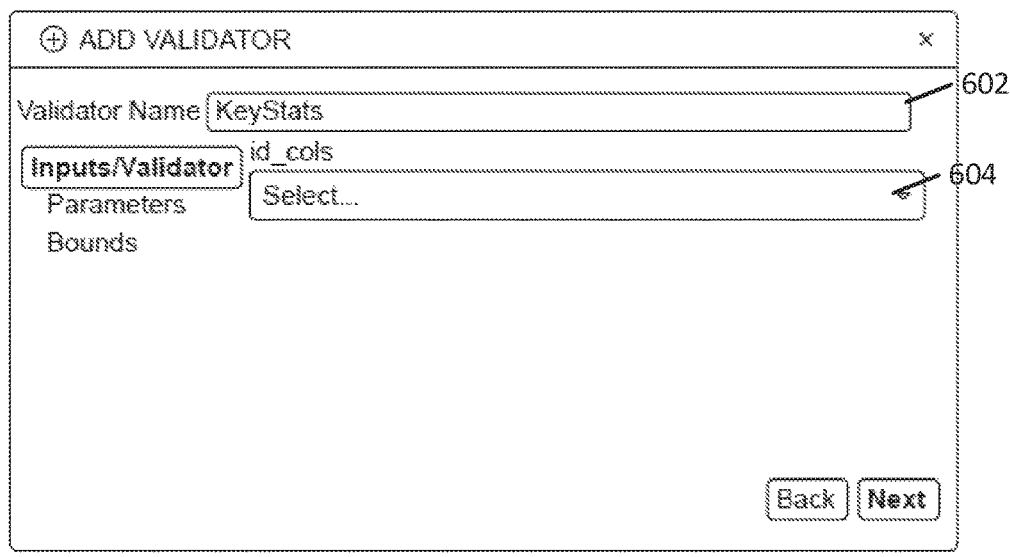
FIG. 6 illustrates an example graphical user interface through which a user can control application of a validator to data in a data set for purposes of validating the data, in accordance with various embodiments.

FIG. 6 illustrates an example graphical user interface 600 through which a user can control application of a validator to data in a data set for purposes of validating the data. The graphical user interface 600 can include a name field 602 that displays a name of a validator selected by a user. In the example graphical user interface 600, the name field 602 indicates a user has selected a key statistics validator. The graphical user interface 600 can also include a validation parameter input field 604 through which a user can input validation parameters for use in configuring the selected validator. In various embodiments, a user can select pre-defined validation parameters for a validator presented to the user in a natural language of the user through the validation parameter input field 604. Additionally, in various embodiments, a user can provide validation parameters as input through the validation parameters input field 604, in a natural language of the user.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 7:
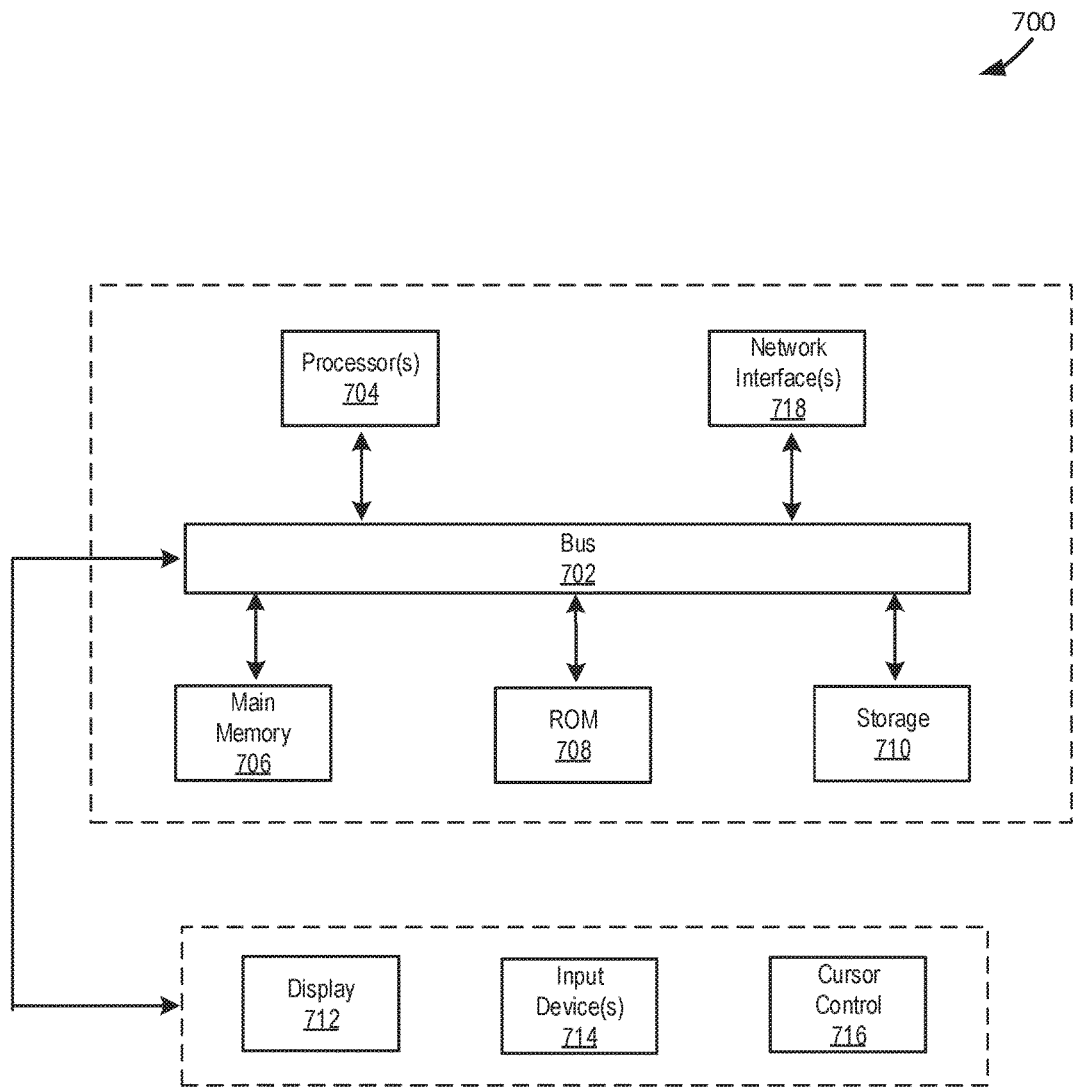
FIG. 7 illustrates a block diagram of an example computer system in which any of the embodiments described herein may be implemented.

FIG. 7 is a block diagram that illustrates a computer system 700 upon which any of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a cathode ray tube (CRT) or LCD display (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may retrieves and executes the instructions. The instructions received by main memory 706 may optionally be stored on storage device 710 either before or after execution by processor 704.

The computer system 700 also includes a communication interface 718 coupled to bus 702. Communication interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational NoSQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system for validating data comprising:
one or more processors and a memory storing instructions that, when executed by the one or more processors, cause the system to:
  select a data set including data to validate based on user input received from a user in interacting with a graphical user interface;
  select a validator including at least one validation parameter to use in validating the data in the data set based on the user input;
  apply the validator to the data in the data set to determine whether one or more statistics generated through application of the validator to the data in the data set using the at least one validation parameter is valid according to at least one validation routine associated with the validator;
  flag the data set as invalid if at least one of the one or more statistics generated through application of the validator are determined to be invalid according to the at least one validation routine;
  generate a data quality report for the data set indicating whether the data set is valid or invalid based on a determination of whether the one or more statistics are valid according to the at least one validation routine;
  selectively present the data quality report to the user through the graphical user interface;
  re-apply the validator to the data in the data set to determine whether the one or more statistics generated through application of the validator to the data in the data set using the at least one validation parameter are valid according to the at least one validation routine;
  generate another data quality report for the data indicating whether the data set is valid or invalid based on a determination made through re-application of the validator to the data in the data set of whether the one or more statistics are valid according to the at least one validation routine; and
  selectively present the another data quality report to the user through the graphical user interface.

2. The system of claim 1, wherein the system is further caused to select the at least one validation parameter based on the user input.

3. The system of claim 1, wherein the system is further caused to:
  select the at least one validation routine based on the user input;
  customize the validator by associating the validator with the at least one validation routine selected based on the user input for use in applying the validator to the data in the data set to determine whether the one or more statistics are valid according to the at least one validation routine.

4. The system of claim 1, wherein the system is further caused to:
  select the at least one validation parameter based on the user input;
  customize the validator by associating the validation parameters with the validator according to the user input.

5. The system of claim 1, wherein the system is further caused to:
  receive additional user input;
  modify the validator to create a modified validator by modifying the at least one validation parameter to create at least one modified validation parameter in the modified validator according to the additional user input;
  apply the modified validator to the data in the data set to determine whether an additional one or more statistics generated through application of the modified validator to the data in the data set using the at least one modified validation parameter are valid according to the at least one validation routine;
  generate another data quality report for the data set indicating whether the data set is valid or invalid based on a determination of whether the additional one or more statistics are valid according to the at least one validation routine; and
  selectively present the another data quality report to the user through the graphical user interface.

6. The system of claim 1, wherein the system is further caused to:
  receive additional user input;
  customize the validator to create a customized validator by modifying the at least one validation routine to create at least one modified validation routine in the customized validator according to the additional user input;
  apply the customized validator to the data in the data set to determine whether an additional one or more statistics generated through application of the customized validator to the data in the data set using the at least one validation parameter are valid according to the at least one modified validation routine;
  generate another data quality report for the data set indicating whether the data set is valid or invalid based on a determination of whether the additional one or more statistics are valid according to the at least one modified validation routine; and
  selectively present the another data quality report to the user through the graphical user interface.

7. The system of claim 1, wherein the system is further caused to re-apply the validator to the data in the data set based on one or a combination of re-application instructions received from a user, a passage of a specific amount of time, and a change made to the data in the data set.

8. The system of claim 1, wherein the system is further caused to:
  select another data set including additional data to validate using the validator based on the user input;
  concurrently with application of the validator to the data in the data set, apply the validator to the additional data in the another data set to determine whether one or more additional statistics generated through application of the validator to the additional data in the another data set using the at least one validation parameter is valid according to the at least one validation routine associated with the validator;
  generate another data quality report for the data set and the another data set indicating whether either or both the data set and the another data set are valid or invalid based on a determination of whether either or both the one or more statistics and the one or more additional statistics are valid according to the at least one validation routine; and selectively present the another data quality report to the user through the graphical user interface.

9. The system of claim 1, wherein the system is further caused to:

select another validator including at least one another validation parameter and at least one another validation routine to use in validating the data in the data set based on the user input;

concurrently with application of the validator to the data in the data set, apply the another validator to the data in the data set to determine whether one or more additional statistics generated through application of the another validator to the data in the data set using the at least one another validator parameter are valid according to the at least one another validation routine associated with the another validator;

generate another data quality report for the data set indicating whether the data set is valid or invalid based on either or both the determination of whether the one or more statistics are valid according to the at least one validation routine and a determination of whether the one or more additional statistics are valid according to the at least one another validation routine; and selectively present the another data quality report to the user through the graphical user interface.

10. A method being implemented by a computing system including one or more physical processors and storage media storing machine-readable instructions, the method comprising:

selecting a data set including data to validate based on user input received from a user in interacting with a graphical user interface;

selecting a validator including at least one validation parameter to use in validating the data in the data set based on the user input;

applying the validator to the data in the data set to determine whether one or more statistics generated through application of the validator to the data in the data set using the at least one validation parameter is valid according to at least one validation routine associated with the validator;

flagging the data set as invalid if at least one of the one or more statistics generated through application of the validator are determined to be invalid according to the at least one validation routine;

generating a data quality report for the data set indicating whether the data set is valid or invalid based on a determination of whether the one or more statistics are valid according to the at least one validation routine;

selectively presenting the data quality report to the user through the graphical user interface;

re-applying the validator to the data in the data set to determine whether the one or more statistics generated through application of the validator to the data in the data set using the at least one validation parameter are valid according to the at least one validation routine;

generating another data quality report for the data indicating whether the data set is valid or invalid based on a determination made through re-application of the validator to the data in the data set of whether the one or more statistics are valid according to the at least one validation routine; and selectively presenting the another data quality report to the user through the graphical user interface.

11. The method of claim 10, further comprising selecting the at least one validation parameter based on the user input.

12. The method of claim 10, further comprising:

selecting the at least one validation routine based on the user input;

customizing the validator by associating the validator with the at least one validation routine selected based on the user input for use in applying the validator to the data in the data set to determine whether the one or more statistics are valid according to the at least one validation routine.

13. The method of claim 10, further comprising:

selecting the at least one validation parameter based on the user input;

customizing the validator by associating the validation parameters with the validator according to the user input.

14. The method of claim 10, further comprising:

receiving additional user input;

modifying the validator to create a modified validator by modifying the at least one validation parameter to create at least one modified validation parameter in the modified validator according to the additional user input;

applying the modified validator to the data in the data set to determine whether an additional one or more statistics generated through application of the modified validator to the data in the data set using the at least one modified validation parameter are valid according to the at least one validation routine;

generating another data quality report for the data set indicating whether the data set is valid or invalid based on a determination of whether the additional one or more statistics are valid according to the at least one validation routine; and selectively presenting the another data quality report to the user through the graphical user interface.

15. The method of claim 10, further comprising:

receiving additional user input;

customizing the validator to create a customized validator by modifying the at least one validation routine to create at least one modified validation routine in the customized validator according to the additional user input;

applying the customized validator to the data in the data set to determine whether an additional one or more statistics generated through application of the customized validator to the data in the data set using the at least one validation parameter are valid according to the at least one modified validation routine;

generating another data quality report for the data set indicating whether the data set is valid or invalid based on a determination of whether the additional one or more statistics are valid according to the at least one modified validation routine; and selectively presenting the another data quality report to the user through the graphical user interface.

16. The method of claim 10, further comprising:

selecting another data set including additional data to validate using the validator based on the user input;

concurrently with application of the validator to the data in the data set, applying the validator to the additional data in the another data set to determine whether one or more additional statistics generated through application of the validator to the additional data in the another data set using the at least one validation parameter is valid according to the at least one validation routine associated with the validator;

generating another data quality report for the data set and the another data set indicating whether either or both the data set and the another data set are valid or invalid based on a determination of whether either or both the one or more statistics and the one or more additional statistics are valid according to the at least one validation routine; and selectively presenting the another data quality report to the user through the graphical user interface.

17. The method of claim 10, further comprising:

selecting another validator including at least one another validation parameter and at least one another validation routine to use in validating the data in the data set based on the user input;

concurrently with application of the validator to the data in the data set, applying the another validator to the data in the data set to determine whether one or more additional statistics generated through application of the another validator to the data in the data set using the at least one another validator parameter are valid according to the at least one another validation routine associated with the another validator;

generating another data quality report for the data set indicating whether the data set is valid or invalid based on either or both the determination of whether the one or more statistics are valid according to the at least one validation routine and a determination of whether the one or more additional statistics are valid according to the at least one another validation routine; and selectively presenting the another data quality report to the user through the graphical user interface.

18. A non-transitory computer readable medium comprising instructions that, when executed, cause one or more processors to perform:

selecting a data set including data to validate based on user input received from a user in interacting with a graphical user interface;

selecting a validator including at least one validation parameter to use in validating the data in the data set based on the user input;

applying the validator to the data in the data set to determine whether one or more statistics generated through application of the validator to the data in the data set using the at least one validation parameter is valid according to at least one validation routine associated with the validator;

flagging the data set as invalid if at least one of the one or more statistics generated through application of the validator are determined to be invalid according to the at least one validation routine;

generating a data quality report for the data set indicating whether the data set is valid or invalid based on a determination of whether the one or more statistics are valid according to the at least one validation routine;

selectively presenting the data quality report to the user through the graphical user interface;

re-applying the validator to the data in the data set to determine whether the one or more statistics generated through application of the validator to the data in the data set using the at least one validation parameter are valid according to the at least one validation routine;

generating another data quality report for the data indicating whether the data set is valid or invalid based on a determination made through re-application of the validator to the data in the data set of whether the one or more statistics are valid according to the at least one validation routine; and selectively presenting the another data quality report to the user through the graphical user interface.

* * * * *